United States Patent
Graham et al.

(10) Patent No.: US 12,444,254 B1
(45) Date of Patent: Oct. 14, 2025

(54) FACILITY ACCESS CONTROLLER

(71) Applicant: Charm Sciences, Inc., Lawrence, MA (US)

(72) Inventors: Paul Graham, Dracut, MA (US); Robert J Markovsky, Brentwood, NH (US); Kenneth Beauchesne, Amherst, NH (US); David Zinland, North Andover, MA (US); Christopher Muise, Derry, NH (US); Patrick Pettengill, Londonderry, NH (US); Lev Pukhovitsky, North Andover, MA (US)

(73) Assignee: Charm Sciences, Inc., Lawrence, MA (US)

(*) Notice: Subject to any disclaimer, the term of this patent is extended or adjusted under 35 U.S.C. 154(b) by 763 days.

(21) Appl. No.: 17/468,968

(22) Filed: Sep. 8, 2021

Related U.S. Application Data

(60) Provisional application No. 63/075,405, filed on Sep. 8, 2020.

(51) Int. Cl.
  *H04L 9/32* (2006.01)
  *G07C 9/00* (2020.01)
  *G16H 10/20* (2018.01)

(52) U.S. Cl.
  CPC ......... *G07C 9/00563* (2013.01); *G16H 10/20* (2018.01); *H04L 2463/082* (2013.01)

(58) Field of Classification Search
  CPC ... H04W 12/06; H04W 12/068; H04W 12/68; G10L 17/00; G07F 7/1008; G07C 9/257; G07C 9/27; G07C 9/00896; G07C 9/22; G07C 9/37; G07C 9/38; G06Q 20/341; G06Q 20/4014; G06Q 20/40145; G06Q 10/10; G06Q 10/109; G06Q 30/0261; G06Q 30/0267; G06Q 50/14; G06Q 50/265; G06F 16/9535; G06F 21/32; G06F 21/34; G06F 21/62; G06F 2221/2107; G06F 1/1647; G06F 1/1654; G06F 1/3218; G06F 21/316; G06F 21/44; G06F 21/554; G06F 21/6218; G06F 2221/2111; G06F 2221/2113; G06F 2221/2143; H04L 2209/56; H04L 63/0861; H04L 9/0866; H04L 9/3231; H04L 2209/80; H04L 2463/082; H04L 63/0428; H04L 63/06; H04L 63/0853; H04L 9/0844; H04L 9/0861; H04L 9/3234; H04L 41/16; H04L 9/3236; H04L 9/3239; H04L 63/08;
(Continued)

(56) References Cited

U.S. PATENT DOCUMENTS 8,868,036 B1 * 10/2014 Nasserbakht ......... H04W 12/06
  455/410
10,154,029 B1 * 12/2018 Griffin .................... H04L 63/06
(Continued)

*Primary Examiner* — Dionne Pendleton
(74) *Attorney, Agent, or Firm* — MacCord Mason PLLC

(57) ABSTRACT

Facility management systems, devices, methods, and assemblies are shown and described. In one embodiment, a method of facility management includes delivering a health-related questionnaire to a user that is external a facility. The system receives an input corresponding to the questionnaire to either trigger generating a pre-access boarding pass or a facility denial. A biometric scanning of the user enabled with a boarding pass may then trigger generating an admission acceptance or said facility denial. The result is improved efficient and effective user evaluation prior to facility admission.

20 Claims, 3 Drawing Sheets

(58) Field of Classification Search
CPC ....... H04L 63/083; H04L 63/10; G16H 10/20; G16H 10/40; G16H 10/60; G16H 15/00; G16H 40/67; G16H 50/80
See application file for complete search history.

(56) References Cited

U.S. PATENT DOCUMENTS

| | | | | |
|---|---|---|---|---|
| 2002/0147588 | A1* | 10/2002 | Davis | G10L 17/00 |
| | | | | 704/E17.003 |
| 2009/0183008 | A1* | 7/2009 | Jobmann | G06F 21/34 |
| | | | | 235/382 |
| 2021/0344852 | A1* | 11/2021 | Isberg | G06V 40/165 |

* cited by examiner

FACILITY ACCESS CONTROLLER

This application claims the benefit of U.S. Provisional application No. 63/075,405, filed Sep. 8, 2020, which is herein incorporated by reference.

FIELD OF THE TECHNOLOGY

The present disclosure relates generally to facility management, and more particularly to improved access control and management systems, methods, and assemblies.

SUMMARY

As shown and described herein, various facility management systems, devices, and methods are helpful for controlling facility access, including indoor facilities, outdoor facilities, a combination thereof, and the like. In particular embodiments, the facility management inventions herein are helpful to detect and deny access to users presenting health condition indicators/symptoms/concerns/and the like, including, but not limited to infectious diseases, for instance a COVID-19 infection and the like.

In one embodiment, a facility access system comprises a user interface to receive at least one user questionnaire input; an access controller having a network enabled communication and in communication with the user interface, wherein the access controller receives the user questionnaire input and generates a pre-access boarding pass or a facility access denial; and a biometric device in communication with the access controller, wherein the biometric device creates at least one biometric input, and wherein the access controller combines the pre-access boarding pass and the at least one biometric input to trigger a facility access allowance or a facility access denial.

In certain examples, the system includes entry relay having an operation integrated by the access controller. The entry relay may include a door relay. The system may include an employee timeclock assembly. The user interface may include a facial recognition device. The user interface may include at least one mobile peripheral. The biometric device may include a thermal scanner, or similar device to test/monitor a biometric. The system may include a bar code scanner in communication with the access controller. The system may include a boarding pass generator in communication with the access controller. The network enabled communication may include a web application server. The network enabled communication may include a data storage server.

In one embodiment, a facility access system comprises an employee recognition interface adapted to receive at least one employee questionnaire input; an access controller having a network enabled communication and in communication with the employee recognition interface, wherein the access controller receives the employee questionnaire input and generates a pre-access boarding pass or a facility access denial; a thermal scanner in communication with the access controller, wherein the thermal scanner creates at least one biometric input, and wherein the access controller combines the pre-access boarding pass and the at least one biometric input to trigger a facility access allowance or a facility access denial; and an employee timeclock assembly adapted to receive an asynchronous data transmission associated with the facility access allowance.

In certain examples, the user interface includes a facial recognition device. The user interface includes at least one mobile peripheral. The access controller may include a first storage database. The system may include a bar code scanner in communication with the access controller. The system may include a boarding pass generator in communication with the access controller. The network enabled communication may include a web application server. The network enabled communication may include a data storage server.

In one embodiment, a facility management system comprises an access controller having a first storage database and a network enabled communication; a user interface adapted to deliver at least one biometric input to the access controller, wherein the access controller adapted to generate a pre-acceptance boarding pass or a facility access denial; a thermal scanner in communication with the access controller and adapted to generate a facility access allowance or a facility access denial; and a timeclock assembly adapted to receive an asynchronous data transmission associated with the facility access indication.

In one embodiment, a facility management system includes an access controller having a network enabled communication; an entry relay having an operation integrated by the access controller; a user interface adapted to deliver at least one health-related input to the access controller, and wherein the access controller generates a pre-access boarding pass or a facility access denial from the at least one health-related input.

In particular examples, a user interface display is in communication with the access controller, for instance a facial recognition device in communication with the access controller. The facial recognition device may include an imaging device. The system may include a thermal scanner in communication with the access controller. The system may include a bar code scanner in communication with the access controller. The system may include a boarding pass generator in communication with the access controller. The boarding pass generator may comprise a boarding pass printer.

In particular examples, the network enabled communication includes a web application server. The network enabled communication may include a data storage server. The network enabled communication may include a wireless access point. The entry relay may include a door relay. The entry relay may include a solenoid-controlled entry lock. The entry relay may include a dry contact relay.

In particular examples, the user interface includes at least one mobile peripheral or the like.

In one embodiment, a method of facility management includes establishing an access controller communication with a user; delivering a health-related questionnaire to the user external of a facility; receiving at least one input from the user corresponding to the questionnaire, and wherein receiving a predetermined input triggers generating a pre-access boarding pass or a facility denial; thermal scanning a user enabled with the boarding pass, and wherein the thermal scanning triggers generating an admission acceptance or the facility denial; and relaying access to a point of entry relay from the admission acceptance.

In particular examples, the method includes establishing an access controller communication includes corresponding data with a web application server. The method may include establishing an access controller communication includes corresponding data with data storage server. The method may include establishing an access controller communication includes corresponding data with an access point, for instance the access point may be a wireless access point.

In particular examples the method may include delivering the questionnaire to the user, for instance delivering at least one health related query. The at least one health related query may include a virus exposure query. The virus exposure query may include a COVID-19 virus exposure query. The at least one health related query may include a respiratory condition query. The at least one health related query may include a recent geographical location query.

In particular examples, the method may include generating the pre-access boarding pass includes generating a code. Generating the code may include printing a QR pre-access boarding pass. Generating the code may include delivering a pre-access boarding pass to the access controller. Generating the code may include delivering a pre-access boarding pass notification to the user. Generating the pre-access boarding pass may include directing a data transmission input to the access controller. Generating the pre-access boarding pass may include developing a data payload.

In particular examples, the method may include delivering the data payload to a data storage server, and developing a data payload. The method may include delivering the data payload to a data storage server.

In particular examples, relaying access to the point of entry may include activating a door relay. Relaying access to the point of entry may include activating a solenoid-controlled entry lock. Relaying access to the point of entry may include activating a dry contact relay.

In particular examples, the method may include triggering a sample collection device. The method may include receiving a sample from the user and generating a rapid response test result. The method may include triggering an admission acceptance from a negative test result. The method may include triggering a facility denial from a positive test result.

In particular examples, the method may include generating an expiration time limit of an admission acceptance. The method may include triggering a requirement for an additional admission acceptance following an expiration time limit. The method may include generating an expiration time limit of a pre-acceptance boarding pass. The method may include triggering a requirement for a pre-acceptance boarding pass admission acceptance following an expiration time limit.

In one embodiment, a facility management system includes an access controller having a network enabled communication; an entry relay having an operation integrated by the access controller; a user interface adapted to deliver at least one health-related input to the access controller, wherein the access controller adapted to generate a pre-acceptance boarding pass or a facility access denial; and a thermal scanner in communication with the access controller and adapted to generate a facility access or a facility access denial In one embodiment, an administrative facility protocol includes establishing an access controller communication with a user; monitoring a health-related questionnaire delivered to the user external of a facility; monitoring at least one input from the user corresponding to the questionnaire; monitoring development of a pre-access boarding pass or a facility denial; monitoring development of a thermal scanning of the user; monitoring development of admission acceptance or the facility denial; and monitoring development of relaying access to a point of entry.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
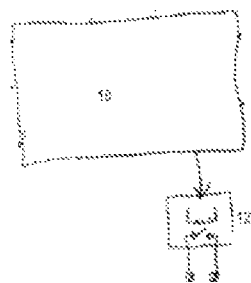
FIG. 1 is a system diagram according to an embodiment of the disclosure.
Figure 2:
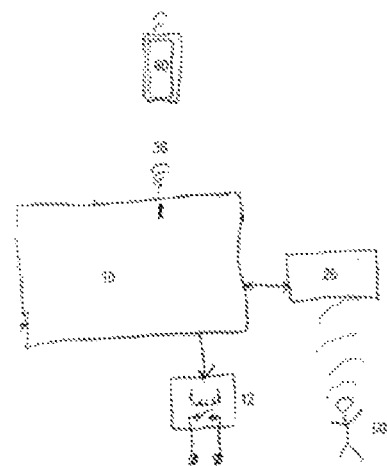
FIG. 2 is a system diagram according to an embodiment of the disclosure.
Figure 2A:
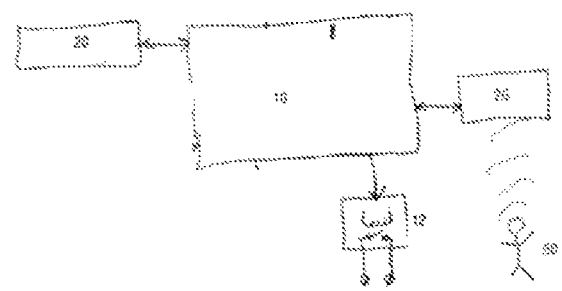
FIG. 2a is a system diagram according to an embodiment of the disclosure.
Figure 3:
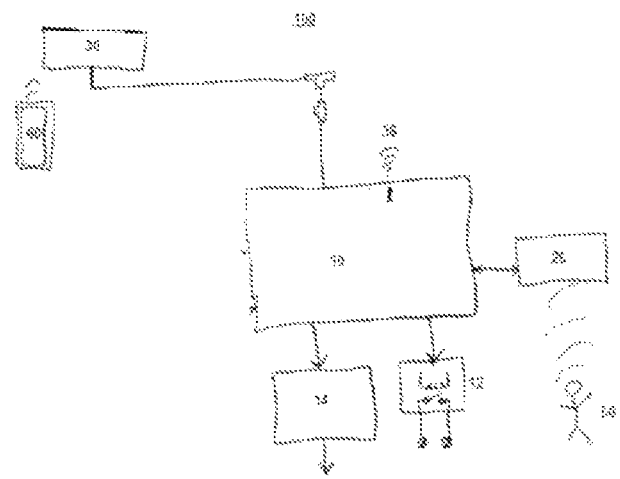
FIG. 3 is a system diagram according to an embodiment of the disclosure.
Figure 4:
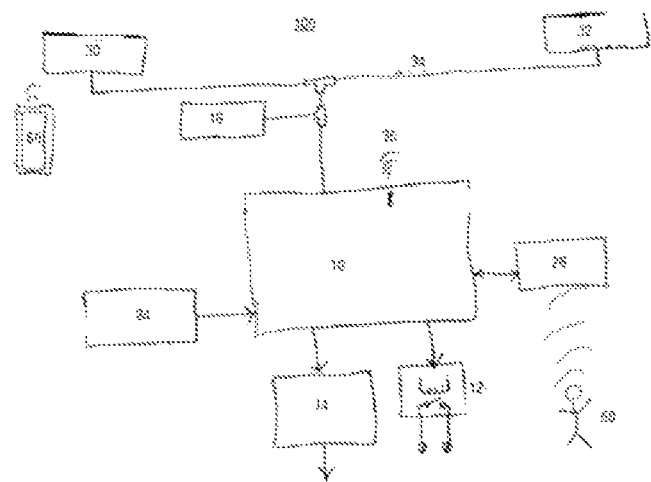
FIG. 4 is a system diagram according to an embodiment of the disclosure.
Figure 5:
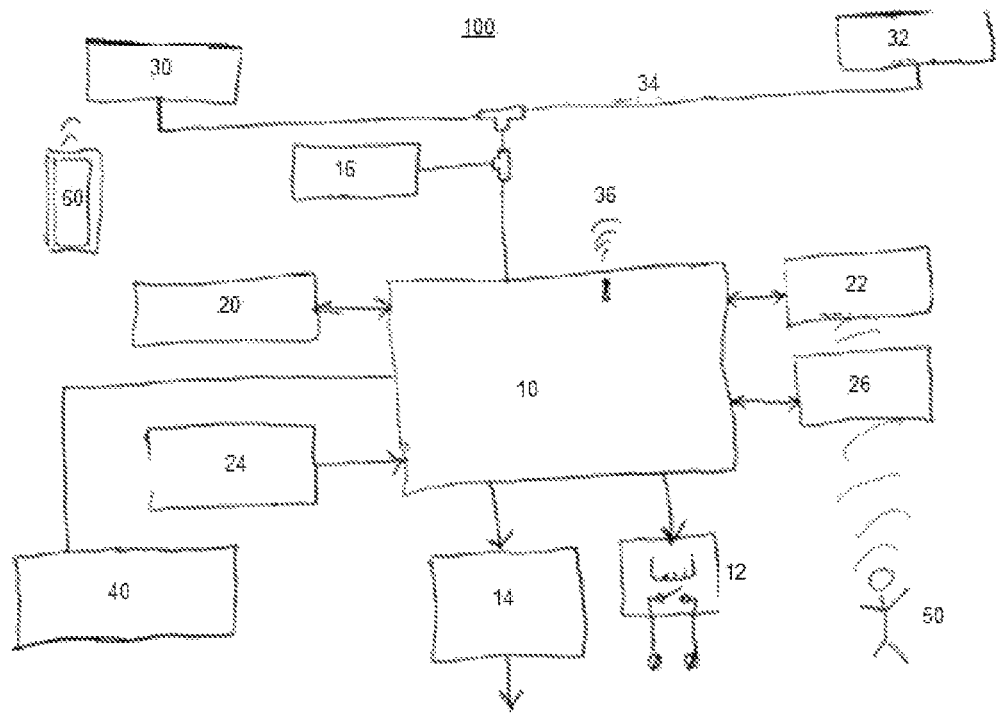
FIG. 5 is a system diagram according to an embodiment of the disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general, and FIG. 1 in particular, it will be understood that the illustrations are for the purpose of describing embodiments of the disclosure and are not intended to limit the disclosure or any invention thereto. As best seen in FIGS. 1-5, a facility access system may include an employee recognition interface; an access controller; a biometric scanner; and, in certain examples, an employee timeclock assembly. For instance, a facility management system may include an access controller 10 having a network enabled communication 34 and a user interface to deliver at least one health-related input shown and described herein, or the like, to the access controller 10. In particular examples, the access controller 10 generates a pre-access boarding pass or a facility access denial, i.e. any of the facility access denials shown and described herein. Next, the access controller 10 combines a pre-access boarding pass with at least one biometric input to trigger a facility access allowance or a facility access denial.

In particular examples, a user interface, including but not limited to an employee recognition interface, is in communication with access controller 10, for instance a facial recognition device 22 in communication with access controller 10. The facial recognition device 10 may include an imaging device, including, but not limited to a camera, video device and the like. The system may integrate a biometric device, for instance a thermal scanner 26, in communication with access controller 10. The system may include a bar code scanner 24 in communication with access controller 10. The system may include a boarding pass generator in communication with the access controller. The boarding pass generator may comprise a boarding pass printer 40, i.e. to generate a ticket, label, printout, and the like. As shown and described herein, the user may facilitate the system in a variety of platforms, including an externally supported panel display 20 or the like.

In particular examples, the network enabled communication 34 includes a web application server 30. The network enabled communication 34 may include a data storage server 32. The network enabled communication 34 may include an access point, for instance a wireless access point 16. The access controller may communicate with the application server via any variety of transmission control protocol (TCP).

In particular examples, the user interface includes at least one mobile peripheral 60, including, but not limited, to a user peripheral phone, tablet, personal device, mobile device, a combination thereof, and the like.

In particular examples, facilities require controlled access for employees, visitors, invitees, and the like. Embodiments of the system described herein may include a web application on which, users such as employees or visitors are asked a series of questions (a quiz) related to health queries, including, but not limited to, exposure to a virus and/or other similar types of facility queries.

In particular examples, upon successful completion of a series of questions, the system triggers a decision whether the user 50 should be granted access. In certain examples, if access is to be permitted, a page with a quick response (QR) code, or the like, is provided back to the user 50. This QR code or boarding pass may be printed for later use or simply stored, or the like. Those skilled in the art having the benefit of this disclosure will recognize additional boarding pass embodiments, applications, and the like.

In particular examples, to gain access to the facility, or to register entry by the user, for instance via a timeclock, time management or employee monitoring system, the user scans a code, for instance barcode, at the entry point which informs the system that the user has successfully passed the first stage of the entry determination. Then, by standing in front of a thermal scanner 26, the users skin temperature is then taken. This information may be combined into a packet of information within the controller and stored in for instance, a comma-separated values (CSV) file or the like. In certain examples, if the user's temperature is below a set limit and a successful scan of the barcode is provided the controller enables access, or in some cases, provides a data transmission to existing access control and/or timeclock equipment.

In particular examples, a timeclock assembly receives an asynchronous data transmission associated with any of the facility access allowances/notifications shown and described herein to integrate facility access with timekeeping functions. Further, the timeclock assembly may integrate timekeeping records/monitoring following a facility denial/notifications. Unexpectedly, Applicant has uncovered a unique timeclock assembly (which traditionally require serial data transmission) may include a sensitive output receiver for an access control interface to provide the integrated facility access demands of accessibility control with asynchronous data timekeeping functionality shown and described herein.

Further, the system may generate any number of employee, visitor, and the like record keeping matrices, reporting, and human readable form records shown and described herein. Therefore, these systems/assembles may systematically and accurately maintain time keeping for employees, including but not limited to hourly employees, thus providing time records for the preparation of payroll and, in addition, for control of time keeping abuses and monitoring of employee productivity.

In particular examples, the system may maintain an identification of users that are allowed access via any of the facility access or admission shown and described herein. This list may contain the users first and last name as well as an access code. In particular examples, when the user logs into the system, for instance the web application embodiment, identifiers, such as first and last name, access code, date and time, and the like, are registered as part of the pre-access granted boarding pass.

In certain examples, the specified identifier having a date and time that facility access is granted further triggers a determination of an expiration time. In particular examples, access is granted for eight hours, twelve hours, twenty four hours, or the like before the system identifies a new pass must be obtained via any of the examples and embodiments shown and described herein.

In one embodiment, a method of facility management includes establishing an access controller communication with a user 50; delivering a health-related questionnaire to the user 50 that is generally positioned external of a facility. The system generally receives at least one input from user 50 that is corresponding to the questionnaire. The system may then trigger generating a pre-access boarding pass or any of the facility denials shown and described herein. The system may then require a user 50 to engage a biometric device, for instance thermal scanning. Therefore, a successful thermal scanning, or the like, triggers generating an admission acceptance or the facility denial. The system may then relay access to a point of entry relay for facility admission acceptance.

In one embodiment, a direct data transmission, or token, is generated by the access controller 10, for instance from the web application. In these examples, the pre-access granted generates a data packet with the associated identifiers and data results transmitted securely to the access controller 10. In particular examples, the controller then stores the users token and allows the user access until expiry of any of the examples herein.

In particular examples, the access control 10 may identify users with a radio-frequency identification (RFID) tag or the like, for instance to provide a serial data transmission signal to controller, for instance that may monitor a facility time in/time out, or simply access control. Further, the system may include an serial interface 14, USB data transmitter, or the like to transmit data.

In one embodiment, a user logs onto the system, takes the quiz, and upon successful initial steps, is granted a QR code after passing the quiz. In certain examples the system may be accessed via a user peripheral, for instance a smartphone, and the QR code may be delivered to the user peripheral on successful completion. The user may then scan the QR code at the controller. In particular examples, the controller may provide a message on a display such as "Pass Expired", "User/ID not found" or "Proceed to Camera", or the like. Those skilled in the art having the benefit of this disclosure will recognize additional user guidance, instructions, progressions, and the like.

In particular examples, the biometric device, including but not limited to a thermal scanner 26, imager, or the like may then determine the users skin temperature, and combines collected info into a data payload. In particular examples, the data payload is transmitted to a central data collection server 32, or the like, and grants facility access. In this embodiment, access granted is an asynchronous data transmission to a timeclock system to "Clock-in" or "Clock-out" the employee user as shown and described herein.

In particular embodiments, any of the outputs shown and described herein may be a printed, possibly color-coded ticket that allows access to a theme park or other recreational facility, such as golf courses, sporting events, ski lifts, or any facility requiring controlled access. Alternate questions on the quiz could include age which determines price of admission, as well as inputs to enhance marketing efforts.

In particular embodiments, a method of facility management includes establishing an access controller communication with a user; delivering a health-related questionnaire to the user external of a facility; receiving at least one input from the user corresponding to the questionnaire, and wherein receiving a predetermined input triggers generating a pre-access boarding pass or a facility denial; thermal scanning a user enabled with the boarding pass, and wherein the thermal scanning triggers generating an admission acceptance or the facility denial; and in certain examples, relaying access to a point of entry relay from the admission acceptance.

As shown and described herein, in certain examples the system may include a web application on which, users, including but not limited to employees or visitors, are asked a series of questions (a single or multiple item questionnaire, quiz, discussion, or the like) or other similar types of queries that facility regulators might require. Upon successful completion of the questionnaire/questions, the web application, or similar application shown and described herein, decides if the user should be granted access. And in certain examples, if access is to be permitted, a page with a QR code is provided back to the user. In certain embodiments, the QR code or "boarding pass" can then be printed, stored, or the like for later use or simply stored, for instance on a personal device.

In certain embodiments, to gain access to the protected facility, or to register entry of a specific user for instance any of the employee timeclock examples herein, the user inputs, for instance scans, the preboarding pass/barcode at the entry point, including but not limited to a locked door, which updates the system that the user has successfully passed the first level of automated accessibility scrutiny. Then, the user engages a biometric device, for instance about a thermal scanner 26 for skin temperature. In certain embodiments, this input is combined into a packet of information within the controller and stored in for instance, a CSV file or the like.

In certain examples, if the biometric device results, for instance a temperature scan, is within a predetermined range the access controller 10 will display Success; the access controller 10 will send the results to the application server; the access controller 10 will grant access to the requested resource; and the access controller 10 will reset and await the next data payload. However, in certain examples, if the biometric device results, for instance a temperature scan, is not within the acceptable range the access controller 10 will display fail, and in certain examples display the reason for the failure; the access controller 10 will send the results to the application server; the access controller 10 will deny access to the requested resource; and the access controller 10 will reset and await the next data payload.

For instance, if the user passes the biometric device, for example a temperature is within a set acceptable limit, and a combination of a successful scan of the barcode, the controller enables access. In certain examples, access includes triggering any of the relays shown and described herein, for instance to open a door. Further, in certain examples, access includes providing a data transmission to existing access control and/or any of the timeclock equipment shown and described herein.

In certain examples, the system maintains a list of users that are allowed access. This list contains the users first and last name as well as an access code. For instance, when the user logs into the web application, a first and last name, access code, date and time are registered as part of the "pre-access granted" boarding pass.

In certain examples, the access controller 10 contains a small database file which may house the users first name, last name, and access code. The file may be manually uploaded to each access controller 10. Upon successful scanning of the QR code, or the like, in certain examples the access controller 10 will display first name, last name, access code, validity of the QR Code. In certain examples, information is logged to the application server. For instance, each user attempt is logged as a separate CSV file that resides in a directory on the application server. Certain examples include compiling and generating archival records, including human resource reporting and the like, for instance details relating to: First name; Last name; access code; date/time QR code created; date/time access was attempted; biometric scan results being under or over the value specified; pass/failure; reason for failure; access controller identification. Those of ordinary skill in the art having the benefit of this disclosure will recognize additional displays.

In certain examples, if the boarding pass, i.e. QR Code or the like, has an expired time range, the application controller will display that the QR Code is expired. For instance, the access controller 10 will display fail, and in certain examples display the reason for the failure; the access controller 10 will send the results to the application server; the access controller 10 will deny access to the requested resource and the access controller 10 will reset and await the next data payload.

In certain examples, the date and time that access is granted is used by the controller may determine expiration time. For instance, expiration time may be a specified time limit, for instance 12 hours, and then a new pass, or in alternatives partial process, must be obtained.

In particular examples, the facility is a closed, locked facility with a dedicated entry door. For instance, the system may include an integrated entry relay 12 having a door relay for admitted access only. The entry relay may include a solenoid-controlled entry lock or the like. Further, the entry relay may include a dry contact relay. Those of ordinary skill in the art having the benefit of this disclosure will recognize additional entry door relay arrangements and accessibility features.

Particular embodiments include the suggestion, consideration, or detection of COVID-19 infection prior to access of a facility, and those skilled in the art having the benefit of this disclosure will recognize useful elements and nomenclature from http://www.centerforhealthsecurity.org/resources/COVID-19/200228-Serology-testing-COVID.pdf, which is incorporated by reference in its entirety.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

We claim:
1. A facility access system comprising:
 a. a user interface adapted to receive at least one user health-related input corresponding to a pre-entry questionnaire;

b. an access controller having a network enabled communication and in communication with said user interface, wherein said access controller receives said at least one user health-related input and evaluates said input based on predetermined screening criteria to generate either a pre-access boarding pass or a facility access denial, and references predetermined biometric skin temperature acceptance range; and c. a biometric device in communication with said access controller, wherein said biometric device obtains at least one biometric skin temperature input from a user and transmits said input to said access controller, and wherein said access controller compares said biometric skin temperature input to said acceptable range to allow facility access only upon determining that both said user has been issued a pre-access boarding pass and said biometric skin temperature input falls within said acceptance range, or said access controller issues a facility access denial in response to either a failure to satisfy said questionnaire criteria or said biometric skin temperature input is outside said acceptance range.

2. The system of claim 1, including an entry relay having an operation integrated by said access controller.

3. The system of claim 2, wherein said entry relay includes a door relay.

4. The system of claim 1, including an employee timeclock assembly.

5. The system of claim 1, wherein said user interface includes a facial recognition device.

6. The system of claim 1, wherein said user interface includes at least one mobile peripheral.

7. The system of claim 1, wherein said biometric device includes a thermal scanner.

8. The system of claim 1, including a bar code scanner in communication with said access controller.

9. The system of claim 1, including a boarding pass generator in communication with said access controller.

10. The system of claim 1, wherein said network enabled communication includes a web application server.

11. The system of claim 1, wherein said network enabled communication includes a data storage server.

12. A facility access system comprising:

a. an employee recognition interface adapted to receive at least one employee health-related input corresponding to a pre-entry questionnaire;

b. an access controller having a network enabled communication and in communication with said employee recognition interface, wherein said access controller receives said at least one user health-related input and evaluates said input based on predetermined screening criteria to generate either a pre-access boarding pass or a facility access denial;

c. a skin temperature thermal scanner in communication with said access controller, wherein said skin temperature thermal scanner creates at least one biometric skin temperature input, and wherein said access controller combines said pre-access boarding pass and at least one acceptable biometric skin temperature input to trigger a facility access allowance or at least one unacceptable biometric skin temperature input to trigger a facility access denial; and d. an employee timeclock assembly adapted to receive a data transmission associated with said facility access allowance.

13. The system of claim 12, wherein said user interface includes a facial recognition device.

14. The system of claim 12, wherein said user interface includes at least one mobile peripheral.

15. The system of claim 12, wherein said access controller having a first storage database.

16. The system of claim 12, including a bar code scanner in communication with said access controller.

17. The system of claim 12, including a boarding pass generator in communication with said access controller.

18. The system of claim 12, wherein said network enabled communication includes a web application server.

19. The system of claim 12, wherein said network enabled communication includes a data storage server.

20. A facility management system comprising:

a. an access controller having a first storage database and a network enabled communication;

b. a user interface adapted to deliver at least one biometric input to said access controller, wherein said access controller adapted to generate a pre-acceptance boarding pass or a facility access denial;

c. a skin temperature thermal scanner in communication with said access controller and adapted to generate a facility access allowance or a facility access denial based on a temperature within an acceptable limit, wherein said access controller compares a biometric skin temperature input to said acceptable limit to allow facility access only upon determining that both said user has been issued a pre-access boarding pass and said biometric skin temperature is within said acceptance limit, or said access controller issues a facility access denial in response to either a failure to satisfy a questionnaire criteria or said biometric skin temperature input is outside said acceptance limit; and d. a timeclock assembly adapted to receive an asynchronous data transmission associated with said facility access indication, and wherein said facility access indication provides a data transmission to an output receiver of said timeclock assembly.

* * * * *